Aug. 10, 1937.     R. B. POLK     2,089,502
FRUIT PEELER
Filed Aug. 2, 1935     3 Sheets-Sheet 3
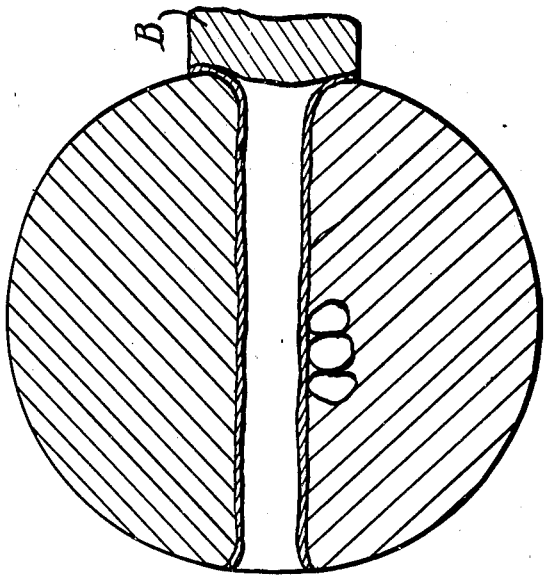
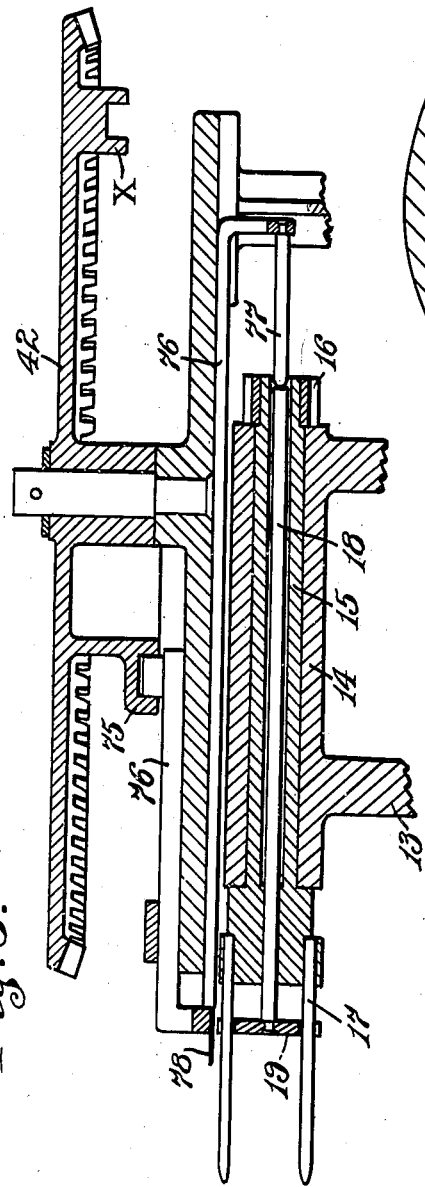
INVENTOR.
Ralph B. Polk,
BY
Hood + Hahn.
ATTORNEYS Patented Aug. 10, 1937

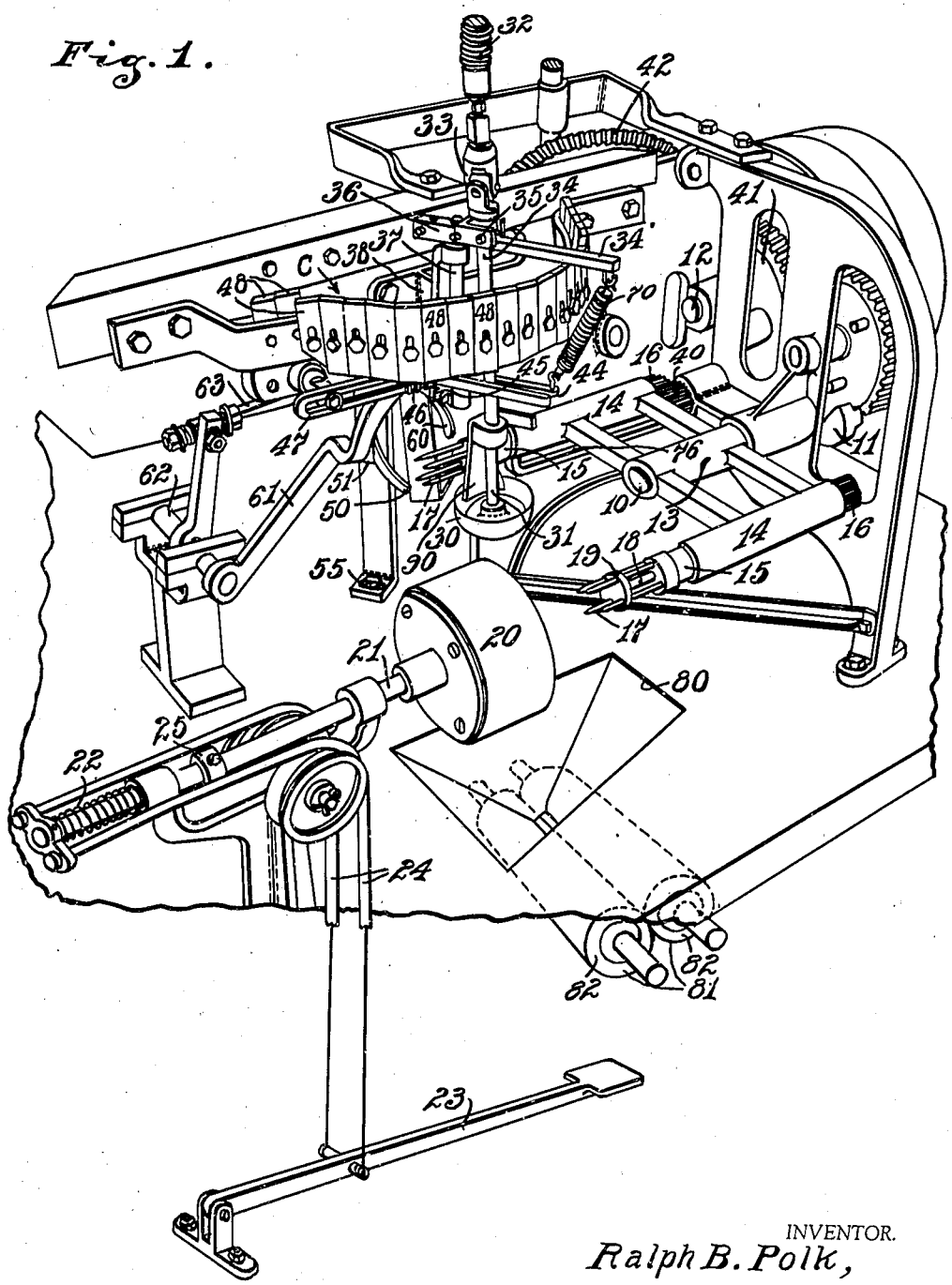

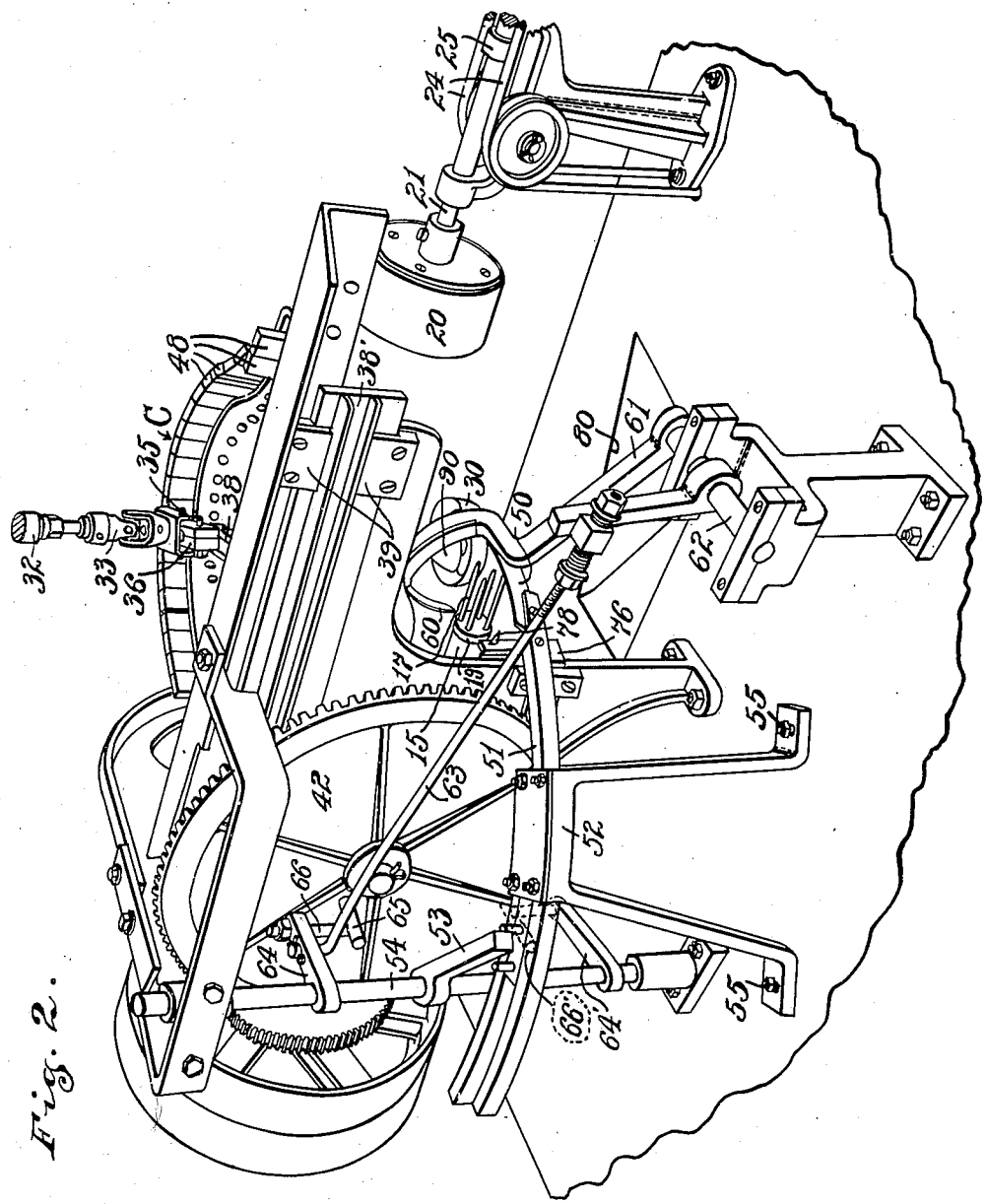

2,089,502

UNITED STATES PATENT OFFICE 2,089,502

FRUIT PEELER

Ralph B. Polk, Haines City, Fla.

Application August 2, 1935, Serial No. 34,348

5 Claims. (Cl. 146—3)

One of the objects of my invention is to provide a machine for removing the major portions of the skin and subjacent circumferential portions of the segment integuments from fruits of that type wherein the meat is in the form of a group of segments enclosed in adherent integuments of segmental form, in order to prepare the fruit for further manipulation to remove the meat segments, free from their integuments. A further object of my invention is to provide an improved method of treating fruits, of the class described, whereby unbroken meat segments free from adherent integuments may be more economically obtained.

The accompanying drawings illustrate an embodiment of my invention.

Fig. 1 is a perspective view of the major portion of my mechanism viewed from the operator's side;

Fig. 2 is a perspective view looking toward the operator's position;

Fig. 3 is a fragmentary horizontal section showing the ejecting mechanism; and

Fig. 4 is a polar section of a peeled fruit.

The mechanism illustrated in the drawings is primarily designed to operate upon grapefruit in such manner as to quickly and efficiently remove outer skin and underlying integuments and to leave undisturbed a circular section, or button, of external skin and subjacent segment integuments at the stem end of the fruit in order that the peeled fruit may be more efficiently handled during segregation of unbroken meat segments freed from their integuments.

In view of the considerable variation in size of fruits in a normal crop it has been found more practical to grade the fruit into several average sizes and to provide machines for each size.

Referring to the drawings, 10 indicates a horizontal shaft which is intermittently forwarded, step-by-step, one-half of a rotation by means of a well known "Swiss-gear" train 11 actuated from the main drive shaft 12.

Shaft 10 carries a cross head 13 having two bearings, 14, 14 parallel with shaft 12 and each supporting a rotary shaft 15 provided at one end with a gear 16 and at the other end with a fork 17 upon which the fruit may be impaled for rotation. Each shaft 15 is hollow and has mounted therein an axially shiftable ejector rod 18 provided at the fork end with a fruit-engaging head 19 slidable between the tines of the fork.

Successive fruits are impaled, stem-end foremost, upon the forks 17, conveniently by means of a centering cup 20, axially alined with one station of the forks, said cup having, in its face, a concave pocket which facilitates good alinement of the polar diameter of the fruit with the axis of the fork.

Cup 20 is carried by a horizontally reciprocable plunger 21 normally urged away from the fork by a spring 22, and movable toward the fork by a foot-treadle 23 connected by cords 24 with the plunger. An adjustable stop-collar 25, on the plunger, serves to guide the operator in driving the fruit upon the fork.

In order to remove the outer skin, or rind, and the subjacent circumferential portions of the segment-shaped integuments which enclose the segment-shaped sections of the meat of the fruit, I provide the rotary cup-shaped paring knife 30 having an upwardly-presented sharp annular cutting edge and carried by a rotary shaft 31 driven, preferably at high speed, by a suitable driving shaft 32 through a universal joint 33.

Shaft 31 is journalled in a tubular carrier 34 hinged at 35 on an arm 36 carried by the vertical rockshaft 37 journalled in the laterally shiftable bracket 38 carried by the sliding bar 38' mounted in a suitable guide way 39 to slide horizontally parallel with the axis of the fork 17 when at the peeling station, i. e., when its gear 16 is in mesh with its driving gear 40 which is constantly rotated by a suitable gear train (part of which is indicated at 41) by which it is connected with the main drive shaft.

Bar 38' is synchronously reciprocated by a suitable cam X on cam wheel 42 connected by a suitable driving train with the main drive shaft, one complete reciprocation of said bar occurring for each step of advancement of the fork head.

Shaft 37 near its lower end carries the slotted arm 44 which straddles, and permits swinging movement of, carrier 34. Shaft 37 also carries the gear segment 45 which intermittently meshes with a rack 46 which is adjustable, parallel with the fork axis at peeling station, by means of the slot and clamping-bolt structure 47.

Carrier 34 is provided with a radially projecting arm 34' which rides upon a cam structure C composed of a plurality of independently adjustable blocks 48, said cam serving to regulate the position of knife 30 relative to the peeling axis.

The blossom end of a grapefruit is relatively flatter (i. e. of larger radius) than the equatorial region and a cup-shaped knife-like cutter 30 cannot act satisfactorily thereon. I therefore provide the curved knife 50 to perform this function. Knife 50 is carried at the free end of an arcuate finger 51 mounted in guide 52 and is reciprocated by means of a finger 53 carried by a rock-shaft 54. By adjustment of guide 52, through the medium of clamping means 55, knife 50 may be adjusted to penetrate the fruit skin adjacent its blossom end to separate that portion of the skin and subjacent portions of the circumferential portions of the segment integuments from the fruit.

In order to define the extent of action of knife 30 adjacent the stem end of the fruit and define the base of a button B of skin to be left intact upon the fruit at its stem end, I provide the knife 60 which is carried by arm 61 on rock-shaft 62 and this arm is reciprocated by pitman 63 connected to arm 64 carried by rock-shaft 54.

Rock-shaft 54 is moved in one direction by the action of pin 65, of cam wheel 42, on the pin 66 carried by arm 64.

The rotary cutter 30 is swept around the periphery of the fruit from near the blossom end to near the stem end, and, as the fruit is not exactly spherical and rock-shaft 37 cannot be accurately positioned in alinement with a diameter of the fruit when in peeling position, the portion of cutter which attacks the fruit, relative to the vertical plane at right angles to the polar axis of the fruit and through shaft 37 shifts toward the left (Fig. 1) as the cutter 30 sweeps from blossom end toward stem end of the fruit. It is for this reason that the combined effect of shift of the axis of shaft 37 and control of position of the cutter 30 by cam C serves to corelate the current active portion of said cutter with the fruit as to cause the cutter to sweep the meat of the fruit in such manner as to remove the peel and subjacent segment integuments. Arm 36 is held down upon cam C by spring 70.

Cam wheel 42 carries a cam 75 which engages a slide 76 provided with a pin 77 which may be projected into shaft 15 to engage the end of ejector rod 18, upon retraction of knives 50 and 61, to eject the peeled fruit from the fork 17.

Slide 76 carries a short knife 78 capable of incising the skin along a zone just outside the diameter of head 19 parallel with the polar axis of the fruit. This knife 78 has a length greater than skin thickness and is so placed that its point, when fully penetrated, will intersect the incision produced by knife 60.

A pin 66' on cam wheel 42 engages an arm 64', at the lower end of shaft 62, to retract knives 50 and 60.

Owing to the natural irregularities in shapes and skin thickness of the fruits, and to the necessary incision of juice cells, to insure removal of the circumferential portions of the segment integuments, the peeling operation unavoidably results in the liberation of a considerable volume of juice and removal of an occasional volume of juice-bearing pulp adherent to the removed peel.

There is, of course, a market for grapefruit juice and therefore, to avoid waste, and consequent money loss which would be reflected in the cost of integument-free fruit segment, I provide a hopper 80 beneath the peeling mechanism in position to receive the free juice and peelings.

The action of cutter 30 is such that any juice-bearing pulp removed thereby adheres to a thin edge of peeling and I have found that the juice in the pulp may be very readily extracted by passing the peelings lengthwise between a pair of wringer rollers 81, 81, arranged at the outlet of the hopper and faced with a soft facing, 82, conveniently of sponge rubber having an impervious skin, or canvas cover. Rollers 81 are rotated by any suitable driving train (not shown) conveniently connected with the main drive shaft.

Means to catch and segregate the freed juice and to segregate the peelings, will, of course, be provided but, as such means may readily be provided, they are not shown in the drawings.

While a fruit is being peeled at the peeling station, the operator may impale another fruit on the fork at the impaling station. Upon completion of the peeling operation, (the knives 50 and 60 having been withdrawn) cam 75 operates to project the ejector head along the tines of the fork 17 at the peeling station and thereby move the peeled fruit. The ejector head 19 acts upon button B which guards the fruit meat at this point.

The button B overlies the inner ends of the meat segments and is naturally bonded to the integuments thereof and therefore, during further manipulation of the peeled fruit to segregate the meat segments from their radial integuments, serves to bond said integuments together against rupture of the cohesive bond between radial integuments of adjacent meat segments.

In order to prevent the rotary knife 30 from gouging the fruit I adjustably mount upon carrier 34, a segmental guard 90 with its free end within the annular cutting edge of said knife.

The operation is as follows:—

One of the impaling forks being in alinement with cup 20 a fruit is seated in said cup with the stem end toward the fork 17 and the polar axis alined, as nearly as possible, with the axis of the fork shaft, and then impaled upon the fork. The tines of the fork are so radially spaced that they will pierce the meat segments in apices between the radial integuments.

Thereupon the "Swiss-gear" acts to advance head 13 a half turn to bring pinion 16 into mesh with gear 40 and thus rotate the fork (clockwise, Fig. 1). At this time bracket 38 is to the left of the position shown in Fig. 1 and arm 34' overlies the left-hand end of cam C with cutter 30 adjacent the blossom end of the fruit but spaced therefrom.

Knives 50 and 60 now move into incising relation to the skin of the fruit and, because of the fruit rotation produce zonal incisions of the skin and underlying circumferential integuments. The point of knife 50 proceeds to and slightly beyond the pole of the fruit (i. e. the axis of rotation of the fork) so that the skin cap, at the blossom end, together with the underlying circumferential integument portions, is severed from the fruit. Thereupon the knives 50 and 60 are retracted and bracket 38 is moved to the right to bring cutter 30 into incising relation with the remaining skin. As bracket 38 proceeds to the right segment 45 is meshed with rack 46 so that shaft 37 is not only moved bodily toward the stem end of the fruit but is swung about its own axis, and concurrently with this movement shaft 31 is adjusted about its hinge support 35 by the coaction of arm 34' with the blocks 48 of cam C. The result of these movements is that cutter 30 incises the skin along a spiral line until the zonal incision produced by knife 60 is reached. At this time slide 76 is moved to the left to cause knife 78 to incise the skin along a zonal line closely adjacent the periphery of head 19 to meet the bottom of the zonal incision made by knife 60 whereupon the end of pin 77 engages rod 18 and projects head 19 to eject the peeled fruit from the fork. While the fruit is being ejected from the fork bracket 38 is being restored to its initial position.

During the peeling operation the operator has been placing a new fruit upon the other fork and the above described operation is repeated.

I claim as my invention:

1. In a citrus fruit peeler, the combination of a rotary fork upon which fruit may be impaled for rotation about its polar axis, a knife projectible transversely of the axis of fruit rotation to incise the skin along a zone distant from the fork-pierced pole of the fruit and in an arcuate path approximately centered on the fork axis to separate a polar cap of skin from the subjacent fruit at the pole distant from said fork, means for projecting and retracting said knife, a second knife projectible transversely of the axis of the fruit to incise the skin along a zone adjacent the fork-penetrated pole of the fruit to define a polar skin-cap without rupturing the natural bond of said cap, means for projecting and retracting said second knife, a third knife, means causing said third knife to transversely incise the skin and to separate the skin from the fruit through a progressive path circumferentially of the fruit from one of said zone incisions to the other.

2. In a citrus fruit peeler, the combination of a rotary fork upon which fruit may be impaled for rotation about its polar axis, a knife projectible transversely of the axis of fruit rotation to incise the skin along a zone distant from the fork-pierced hole of the fruit and in an arcuate path approximately centered on the fork axis to separate a polar cap of skin from the subjacent fruit at the pole distant from said fork, means for projecting and retracting said knife, a second knife projectible transversely of the axis of the fruit to incise the skin along a zone adjacent the fork-penetrated pole of the fruit to define a polar skin-cap without rupturing the natural bond of said cap, means for projecting and retracting said second knife, a third knife, means causing said third knife to transversely incise the skin and to separate the skin from the fruit through a progressive path circumferentially of the fruit from one of said zone incisions to the other, a fourth knife movable substantially parallel with the axis of fruit rotation and arranged to incise the skin along a polar zone intersecting the zonal incision of the aforesaid second knife.

3. In a citrus fruit peeler, a rotary fork upon which the fruit may be impaled, an ejector axially of and coaxial with said fork and rotatable therewith, and a knife movable with said ejector and arranged to produce a substantially cylindrical zonal incision skin depth through the skin of the impaled fruit adjacent but outside the fork substantially parallel with the polar diameter and without disturbance of the adjacent polar cap of skin overlying the tips of the fruit segments.

4. In a citrus fruit peeler, a rotatable head, a plurality of fruit impaling forks, independently journaled in said head and each provided with a gear by which it may be driven, means by which said head may be advanced to bring the several forks successively to a peeling station, a driving gear arranged to be successively meshed by the fork gears when at the peeling station, an ejector associated with each fork and rotatable therewith, a reciprocable element arranged adjacent the peeling station and engageable with each ejector when at said station, and a knife coordinated with said ejector and arranged to incise the fruit skin to the fruit meat along a polar zone outside the fork immediately prior to fruit ejection substantially parallel with the polar diameter and without disturbance of the adjacent polar cap of skin overlying the tips of the fruit segments.

5. In a citrus fruit peeler, a rotatable fork upon which the fruit may be impaled, a rotary cup-shaped knife having an annular cutting edge, a support for said knife movable parallel with the axis of fruit rotation, a mounting for said knife on said support comprising a journal bearing for said knife swingable upon said support about two axes at right angles to each other, and a stationary cam composed of a plurality of independently adjustable elements arranged in series to control the movement of said journal bearing relative to one of its axes.

RALPH B. POLK.